US010571880B2

(12) United States Patent
Petzen, III et al.

(10) Patent No.: US 10,571,880 B2
(45) Date of Patent: Feb. 25, 2020

(54) SYSTEM AND METHOD FOR SYNCHRONIZATION OF DEVICE COMMUNICATION

(71) Applicant: General Electric Company, Schenectady, NY (US)

(72) Inventors: John Alexander Petzen, III, Roanoke, VA (US); Timothy John Kolb, Salem, VA (US); Dana Robert Kreft, Roanoke, VA (US); Isaac Millen Rushing, Fincastle, VA (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 15/710,788

(22) Filed: Sep. 20, 2017

(65) Prior Publication Data

US 2019/0086892 A1   Mar. 21, 2019

(51) Int. Cl.
  *G05B 19/042*   (2006.01)
  *G05B 19/418*   (2006.01)
  *H04L 12/40*    (2006.01)

(52) U.S. Cl.
  CPC ..... *G05B 19/0423* (2013.01); *G05B 19/0421* (2013.01); *G05B 19/4185* (2013.01); *H04L 12/40* (2013.01); *H04L 12/40202* (2013.01); G05B 2219/25008 (2013.01); G05B 2219/25228 (2013.01); G05B 2219/25274 (2013.01); G05B 2219/31124 (2013.01); G05B 2219/31375 (2013.01); G05B 2219/34413 (2013.01)

(58) Field of Classification Search
  None
  See application file for complete search history.

(56) References Cited

U.S. PATENT DOCUMENTS

| 8,375,237 B2 | 2/2013 | Pettigrew et al. |
| 2010/0241277 A1* | 9/2010 | Humphrey .......... G01F 23/0076 700/282 |
| 2014/0126583 A1 | 5/2014 | Petzen et al. |
| 2015/0168946 A1* | 6/2015 | Duvvuri ........... G05B 19/41855 700/20 |

(Continued)

OTHER PUBLICATIONS

Shephard, et al.; "Implementation of IEEE Std.-1588 in a Networked I/O Node," GE Drives & Controls, Inc., Salem, VA, Sep. 24, 2003 (22 pages).

*Primary Examiner* — Henry Tsai
*Assistant Examiner* — Aurangzeb Hassan
(74) *Attorney, Agent, or Firm* — Fletcher Yoder, P.C.

(57) ABSTRACT

An industrial controller that controls operation of an industrial system. The industrial controller comprises a processor and a memory storing instruction, wherein the instructions cause the processor to perform certain functions. In particular, the instructions cause the processor to communicate high speed data in a first industrial protocol between the industrial controller and a high speed device during a first frame section but not during a second frame section of a controller frame of the industrial controller and communicate linking device data in a second industrial protocol between the industrial controller and a linking device during the second frame section but not during the first frame section or during the third frame section of the controller frame.

20 Claims, 3 Drawing Sheets

(56) References Cited

U.S. PATENT DOCUMENTS

2015/0295829 A1* 10/2015 Palmhager ............ G06F 13/385
                                                          709/217
2016/0085479 A1*  3/2016 Edmiston .............. G06F 3/0659
                                                          711/154

* cited by examiner

SYSTEM AND METHOD FOR SYNCHRONIZATION OF DEVICE COMMUNICATION

BACKGROUND OF THE DISCLOSURE

The subject matter disclosed herein relates to communication between devices, and more specifically, to synchronizing device communication.

Certain systems, such as industrial control systems, may provide for control capabilities, via an industrial controller, that enable the execution of computer instructions in various types of devices, such as sensors, pumps, valves, and the like. In addition, the industrial control systems may provide for capabilities that enable communication with various input/output (I/O) subsystems to retrieve data indicative of the industrial system, and to actuate certain devices. Accordingly, improving the communication between the industrial control system and the I/O subsystems, respectively, may be advantageous.

BRIEF DESCRIPTION OF THE DISCLOSURE

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the disclosure may encompass a variety of forms that may be similar to or different from the embodiments set forth below.

In a first embodiment, an industrial controller that controls operation of an industrial system. The industrial controller comprises a processor and a memory storing instruction, wherein the instructions cause the processor to perform certain functions. In particular, the instructions cause the processor to communicate high speed data in a first industrial protocol between the industrial controller and a high speed device during a first frame section but not during a second frame section of a controller frame of the industrial controller and communicate linking device data in a second industrial protocol between the industrial controller and a linking device during the second frame section but not during the first frame section of the controller frame.

In a second embodiment, a method of communicating data associated with an industrial system is provided. The method includes communicating, via a processor of an industrial controller, high speed data in a first industrial protocol between the industrial controller and a high speed device during a first frame section but not during a second frame section of a controller frame of the industrial controller. Furthermore, the method includes communicating, via the processor, linking device data in a second industrial protocol between the industrial controller and a linking device during the second frame section, and buffering, via the processor, the communication of linking device data during first frame section.

In a third embodiment, a non-transitory tangible computer-readable medium storing instructions thereon to be executed by a processor of an industrial controller that controls operations of an industrial system is provided. The instructions, when executed, cause the processor to communicate high speed data in a first industrial protocol between the industrial controller and a high speed device during a first frame section and a third frame section but not during a second frame section of a controller frame of the industrial controller. Furthermore, the instructions cause the processor to communicate linking device data in a second industrial protocol between the industrial controller and a linking device during the second frame section and buffer the communications of the linking device data during the first frame section and the third frame section.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DISCLOSURE

Figure 1:
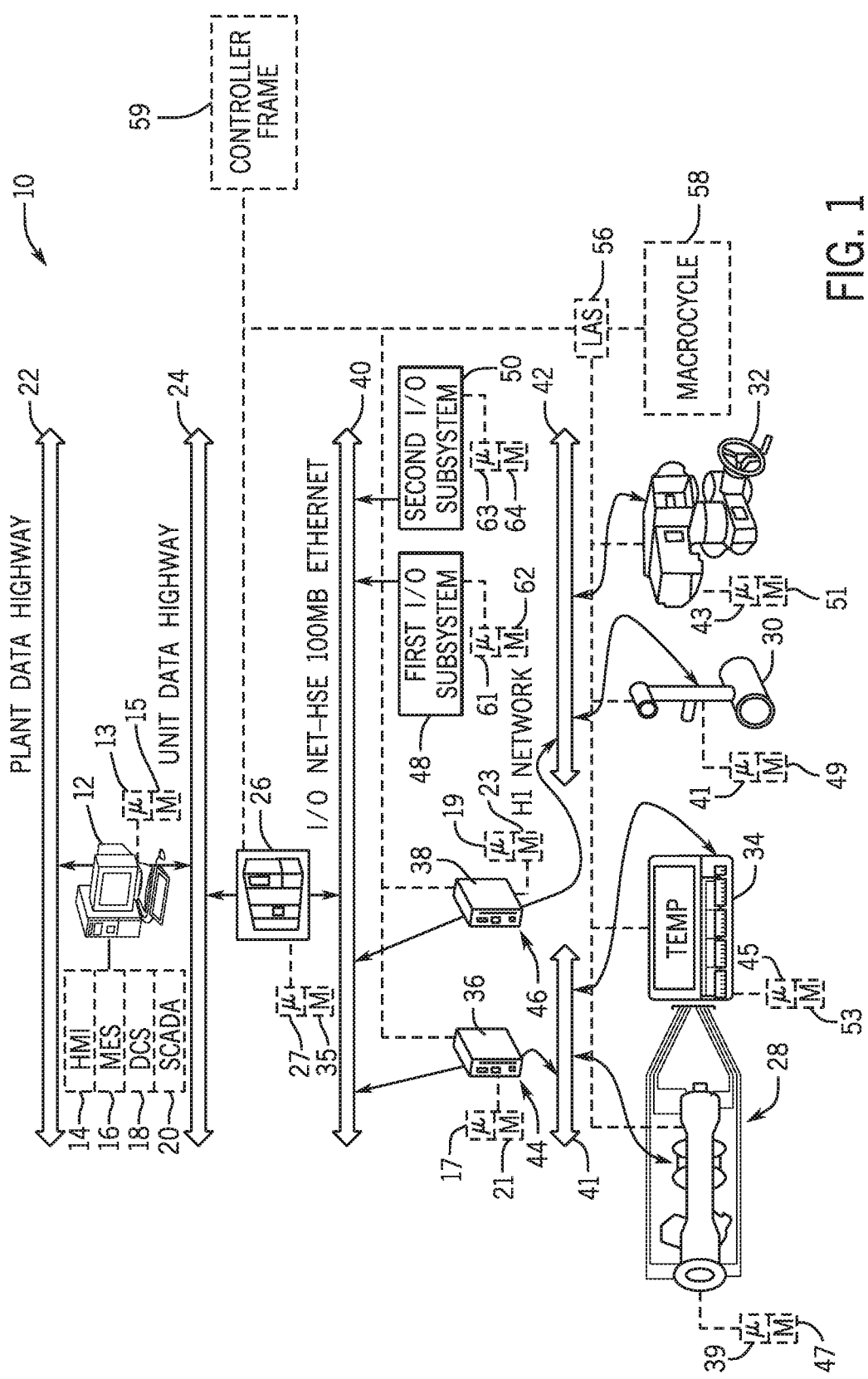
FIG. 1 is a schematic diagram of an embodiment of an industrial control system, including one or more high speed I/O subsystems and one or more linking devices, communicatively coupled to an industrial controller.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Industrial automation systems may include controller systems communicatively coupled to various subsystems, such as high speed input/output (I/O) subsystems, and suitable for interfacing with a variety of field devices, such as sensors, pumps, valves, and the like. High speed I/O subsystems may include I/O subsystems associated with the controller systems. In some embodiments, the high speed I/O subsystems and the control systems include similar manufactures. Additionally or alternatively, the high speed I/O subsystems may be included in the control system. The high speed I/O subsystems may facilitate communication between field devices, such as sensors, and the control systems. For example, the sensors may provide inputs to the controller system, and the controller system may then derive certain actions in response to the inputs, such as actuating the valves, driving the pumps, controlling temperatures associated with the operations of a gas turbine system, and so on. In certain controller systems, such as the Mark VIe controller system, available from General Electric Co., of Schenectady, N.Y., multiple devices may be communicatively coupled to and controlled by a controller, and the controller may support a variety of communication protocols used by the multiple devices. The devices communicatively connected to the controller may include field devices that support an Ethernet Global Data (EGD) communications protocol. The field devices may also include FOUNDATION Fieldbus™ devices that support a FOUNDATION Fieldbus™ H1 bi-directional communications protocol. The devices may be communicatively connected with the controller through via a linking device, such that the linking device receives communication from the devices via the H1 network and communicates with the controller via an HSE network. In addition, some devices may be attached to other protocols further described below, to enable a plant-wide network of devices. In addition, the high speed I/O subsystems may be communicatively connected to the controller to provide the controller data indicative of the various subcomponents of the industrial machinery. Accordingly, the high speed I/O subsystems may communicatively connect directly to the controller in similar or other communication segments, such as a 100 Megabit (MB) high speed Ethernet (HSE) segments, to facilitate the communication of data indicative of the performance industrial machinery. Indeed, the HSE and EGD may use the same Ethernet physical layer.

One or more types of periodic time cycles, may be used, during which computer instructions, including application instructions, communications instructions, synchronization instructions, and the like, may be executed. The controller may have a first periodic time cycle (e.g., a controller frame) when interfacing with external device (e.g., the high speed I/O subsystem) that differs from a second periodic time cycle (e.g., a macrocycle) of the linking device (e.g., or other protocols) performing operations, such as interfacing between the controller and a field device. To facilitate discussion, the periodic time cycle at which the communication between the high speed I/O subsystem and the controller occurs at will be called "the controller frame," while the periodic time cycle at which the communication between the (e.g., low speed) linking device and the controller occurs at will be called "the macrocycle." The first and second periodic time cycles may differ in time, such that, for example, the first periodic time cycle (e.g., the controller frame) may complete in a shorter time when compared to the second periodic time cycle (e.g., the macrocycle), as described below. Using the techniques described herein, systems and methods may enable or facilitate bandwidth conservation in a network (e.g., Ethernet network).

Additionally or alternatively, using the techniques described herein, the controller frame may be modified to enable a more efficient communication (e.g., transmit/send data to and receive data from) between the controller and certain devices, such as FOUNDATION Fieldbus™ devices, Profibus devices communicating via FOUNDATION Fieldbus™ protocols, and other Profibus protocols. As a FOUNDATION Fieldbus™ example, during a certain section of the controller frame, applications may execute and issue commands to the field devices attached via a linking device, such as commands suitable for setting a valve in a desired position (e.g., fully open, partially open, fully closed), commands for deriving decisions based on sensor inputs, and more generally, commands useful in executing a control logic.

Sending these commands to the field devices may be improved when communication between the linking device and the controller is more synchronized. However, as may be appreciated, the communication between the controller and the FOUNDATION Fieldbus™ may be occurring at periodic time cycles having different times lengths. The present techniques include systems and methods for improving the communication between the controller and devices operating with different periodic time cycles and supporting communications through network segments of different types.

Specifically, the present techniques include dividing controller frames into multiple periodic portions. The periodic portions of the controller frame each provide for the execution of a set of corresponding tasks, which may be periodically performed for the duration of the controller frame. The controller frames may enable communication between the linking device (e.g., the device operating at a longer periodic time cycle) and the controller during the section(s) of the controller frame that may not have been intended for communication, for example, sections of the controller frame intended for data processing. Furthermore, the present techniques include buffering communications between the controller and devices using low speed protocols, such as linking device and field devices linked to the controller via the linking devices, thus providing for a way to "push out" slower bandwidth communications to sections of the controller frame previously used for data processing. This "push out" of slower communicating devices results in the controller using the section of the controller frame(s) that were traditionally used in communication now being used for communication with faster (e.g., high speed) devices only. Accordingly, two communication times or segments may be provided by the techniques described herein in the controller frame. "Fast" devices may use the standard controller frame communication segment, and "slow" (e.g., low speed devices such as FOUNDATION Fieldbus™ and/or Profibus) devices may be buffered to use a controller frame data processing segment. Developing systems and methods, to facilitate the communication of data (e.g., high speed synchronous and low speed synchronous data) between various types of devices (e.g., each operating at various bandwidths and speed) and the controller, may facilitate bandwidth conservation (e.g., in an Ethernet network) and enhance the efficiency and reliability of communication between these various types of devices coupled to the controller and operating at various network segments.

In addition, the present techniques systems and methods for improved bandwidth utilization in an Ethernet network. In particular, a variety of communications devices on an Ethernet network is provided herein, such that each communications device independently keeps track of time using IEEE 1588. The communications devices independently use the schedule of either the high speed or the low speed communications to interleave communications, such that bandwidth utilization is improved. High speed data is communicated during one section of the controller frame, and low speed data is communicated at a different section of the controller frame.

Turning to FIG. 1, an embodiment of an industrial process control system 10 is depicted. The industrial process control system 10 may include a computer system 12 suitable for executing a variety of field device configuration and monitoring applications, and for providing an operator interface through which an engineer or technician may monitor the components of the industrial process control system 10. Accordingly, the computer 12 includes a processor 13 that may be used in processing computer instructions, and a memory 15 that may be used to store computer instructions and other data. The computer system 12 may include any type of computing device suitable for running software applications, such as a laptop, a workstation, a tablet computer, or a handheld portable device (e.g., personal digital assistant, tablet, or cell phone). Indeed, the computer system 12 may include any of a variety of hardware and/or operating system platforms. In accordance with one embodiment, the computer 12 may host an industrial control software, such as software for a human-machine interface (HMI) 14, a manufacturing execution system (MES) 16, a distributed control system (DCS) 18, and/or a supervisor control and data acquisition (SCADA) system 20. The HMI 14, MES 16, DCS 18, and/or SCADA 20 may include executable code instructions stored on non-transitory tangible computer readable media, such as the memory 15 of the computer 12. For example, the computer 12 may host the ControlST™ software, available from General Electric Co., of Schenectady, N.Y.

Further, the computer system 12 is communicatively connected to a plant data highway 22 suitable for enabling communication between the depicted computer 12 and other computers 12 in the plant. Indeed, the industrial process control system 10 may include multiple computer systems 12 interconnected through the plant data highway 22. The computer system 12 may be further communicatively connected to a unit data highway 24, suitable for communicatively coupling the computer system 12 to an industrial controller 26. The industrial controller 26 may include a processor 27 suitable for executing computer instructions or control logic useful in automating a variety of plant equipment, such as a turbine system 28, a valve 30, a pump 32 and a temperature sensor 34. The industrial controller 26 may further include a memory 35 for use in storing, for example, computer instructions and other data. The industrial controller 26 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 26 may be a Mark VIe controller system, available from General Electric Co., of Schenectady, N.Y. The industrial controller 26 may be include instructions stored in memory 35 that, when executed by the processor 27, cause the processor 27 to perform the disclosed subject matter of FIGS. 2 and 3.

Furthermore, in the depicted embodiment, field devices, such as the turbine system 28, the valve 30, the pump 32, and the temperature sensor 34, are communicatively connected to the industrial controller 26 by using linking devices 36 and 38 suitable for interfacing between an I/O network 40 (e.g., the 100 Megabit (MB) high speed Ethernet (HSE) network) and a first H1 network 41 (e.g., 31.25 kB H1 network) and a second H1 network 42. For example, the linking devices 36 and 38 may include an HSE to H1 linking device. As depicted, the first linking device 36 may interface with the turbine system 28 and the temperature sensors 34 via the corresponding first H1 network 41, and send communications to the controller 26 via the I/O network 40. In addition, the second linking device 38 may interface with the valve 30 and the pump 32 via the corresponding second H1 network 42, and send and receive communications from the industrial controller 26 via the I/O network 40. For example, the linking devices 36, 38 may communicate slow speed data with the industrial controller 26, such as data indicative of a compressor inlet bleed heat temperature associated with the industrial system, a fuel tank fluid level associated with the industrial system, a lube oil temperature associated with the industrial system, and the like. Furthermore, the linking devices 36 and 38 may include processors 17 and 19, respectively, useful in executing computer instructions, and may also include memory 21 and 23, useful in storing computer instructions and other data. As mentioned above, in some embodiments, the I/O network 40 may be a 100 Megabit (MB) high speed Ethernet (HSE) network, and the H1 networks 41 and 42 may each be a 31.25 kB/second network. Furthermore, the HSE and the EGD network may use the same Ethernet physical layer.

In the depicted embodiment, a first high speed I/O subsystem 48 and a second high speed I/O subsystem 50 may each be communicatively coupled to the industrial controller 26 via the I/O network 40. As described herein the first and the second high speed I/O subsystems 48 and 50 may be faster I/O systems, employing communication protocols associated with the controller 26. For example, in cases when the controller 26 includes I/O subsystem 48, 50 such as a PPRO Backup Turbine Protection, a PTUR Primary Turbine Protection I/O Pack, a PVIB Vibration Monitor, a PSVO Servo Control, a PAIC Analog Input/Output, a PDIA Discrete Input, a PTCC Thermocouple Input, and/or a PRTD RTD Input available from General Electric Co., of Schenectady, N.Y., the I/O subsystems 48, 50 may communicate via an Ethernet Global Data (EGD) communications protocol over the I/O network 40. In turn, the first and the second high speed I/O subsystems 48 and 50 may be communicatively coupled to the controller 26, as further described below, and include sensors and actuators to communicate, for example, machinery conditions and to actuate actuators to control the machinery. For example, the high speed I/O subsystems 48 and 58 may be used to determine various operation parameters and communicate the operation parameters as high speed data with the industrial controller 26. The high speed data may include data indicative of vibrations, fuel flows, and compressor discharge pressure associated with the industrial machinery (e.g., gas turbine system).

The first high speed I/O subsystem 48 may include processor 61 and memory 62, and the second high speed I/O subsystem 50 may include a processor 63 and memory 64 to, respectively, facilitate respective communications with the industrial controller 26. The memory 62 and 64 may store instructions that when executed by the processors 63 and 64, respectively, cause the processors 63 and 64 to perform the process and functions defined in detail below. In some embodiments, the first high speed I/O subsystem 48 and the second high speed I/O subsystem 50 may each communicate (e.g., receive and send) data to the industrial controller 26 during execution of a controller frame 59. The controller frame 59 may include a periodic time cycle that provides for the execution of instruction (e.g., via the processor) to facilitate or enable certain functions, such as communication between various devices, processing of data, and so on.

In some embodiments, the controller frame 59 includes a periodic time cycle that provides for the execution of instructions, for example, to facilitate or enable communication between various devices, the processing of data, and so on. In some embodiments, the controller frame 59 and the high speed I/O subsystems 48 and 50 (and other components communicatively coupled to the industrial controller 26) are synchronized using IEEE 1588 Precision Time Protocol (PTP). That is, the industrial controller may operate using IEEE 1588 PTP. Furthermore the data communicated by the high speed I/O subsystems 48 and 50 may include data indicative of the performance of subsystems of the industrial machinery. For example, the controller 26 may couple to certain high speed I/O subsystems, such as the PTUR I/O pack to determine and communicate data (e.g., a signal) indicative of the shaft speed.

Moreover, the data communicated through the I/O network 40 may in turn be sent and received for communications in other protocols. In the depicted example, the linking devices 36 and 38 may act as bridges between the I/O network 40 and the H1 networks 41 and 42, respectively, to communicate via FOUNDATION Fieldbus™ protocol(s). For example, higher speed data on the I/O network 40 may be buffered, and then sent at some suitable (e.g., lower) speed on the H1 networks 41 and 42. Accordingly, a variety of field devices, such as devices supporting FOUNDATION Fieldbus™ protocol(s), may be linked to the industrial controller 26 and to the computer 12 via the linking devices 36 and 38. For example, the field devices 28, 30, 32, and 34 may include or may be industrial devices, such as FOUNDATION Fieldbus™ devices that include support for the FOUNDATION Fieldbus™ H1 bi-directional communications protocol. The field devices may also include support for other communication protocols, such as those found in the Profibus Nutzer Organization e.V. (PNO) protocol.

Each of the linking devices 36 and 38 may include one or more segment ports 44 and 46 useful in segmenting the H1 networks 41 and 42, respectively. For example, the linking device 36 may use the segment port 44 to communicatively couple with the devices 28 and 34 via the first H1 network 41, while the linking device 38 may use the segment port 46 to communicatively couple with the devices 30 and 32 via the second H1 network 42. Distributing the input/output between the devices 28, 30, 32, and 34, by using, for example, the segment ports 44 and 46, may enable a physical separation useful in maintaining fault tolerance, redundancy, and improving communications time.

Figure 2:
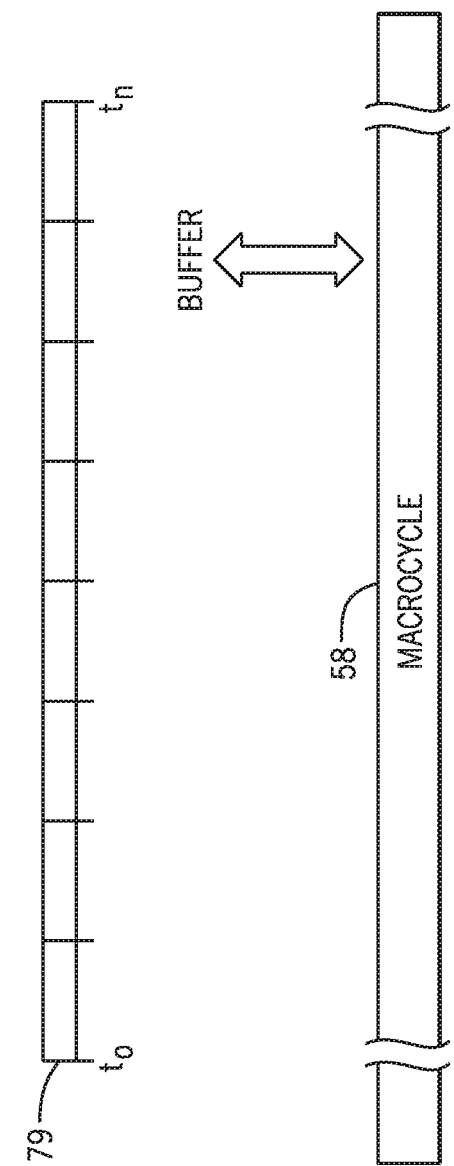
FIG. 2 is a block diagram of an embodiment of a controller frame associated with the one or more high speed I/O subsystem of FIG. 1 and a macrocycle corresponding to the one or more linking devices of FIG. 1.

A Link Active Scheduler (LAS) 56 may be disposed in each of the linking devices 36 and 38, and/or the field devices 28, 30, 32, and 34 for scheduling the execution of the computer instructions. That is, the LAS 56 may include computer readable instructions that may be stored in memory devices 21 and 23 of the linking devices 36 and 38, respectively, such that the instructions, when read by the processors 17 and 19, may cause the processors 17 and 19 to execute a series of functions. For example, the execution of computer instructions to transmit sensor data may be scheduled in a macrocycle 58 by the LAS 56. The macrocycle 58 may differ from the controller frame 59. The techniques describe herein may enable different communication time segments for different classes of subsystems. The high speed I/O subsystems 48, 50 may communicate in a first time segment of the controller frame 59 and the slower devices, e.g., FOUNDATION Fieldbus™ devices, Profibus devices, linking devices 36, 38 may communicate in a second time segment of the controller frame 59. Accordingly, FIG. 2 depicts a block diagram of the macrocycle 58 (e.g., macrocycle used by a low speed protocol such as FOUNDATION Fieldbus™ protocol(s), Profibus protocol (s), linking device 36, 38) and the controller frame 59, respectively, whereby the synchronization of communication in a network (e.g., Ethernet network) and the bandwidth conservation in this network is provided via the techniques disclosed herein. The systems and methods depicted in the block diagram 70 of FIG. 2 may be implemented as executable code instructions stored on non-transitory, tangible, machine-readable media, such as the computer memory 15 shown in FIG. 1.

Figure 3:
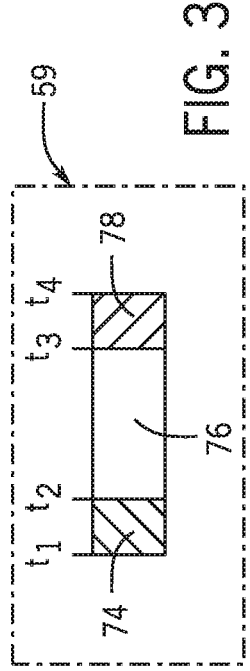
FIG. 3 is a block diagram of the controller frame of FIG. 2 and corresponding sections of the controller frame.
Figure 4:
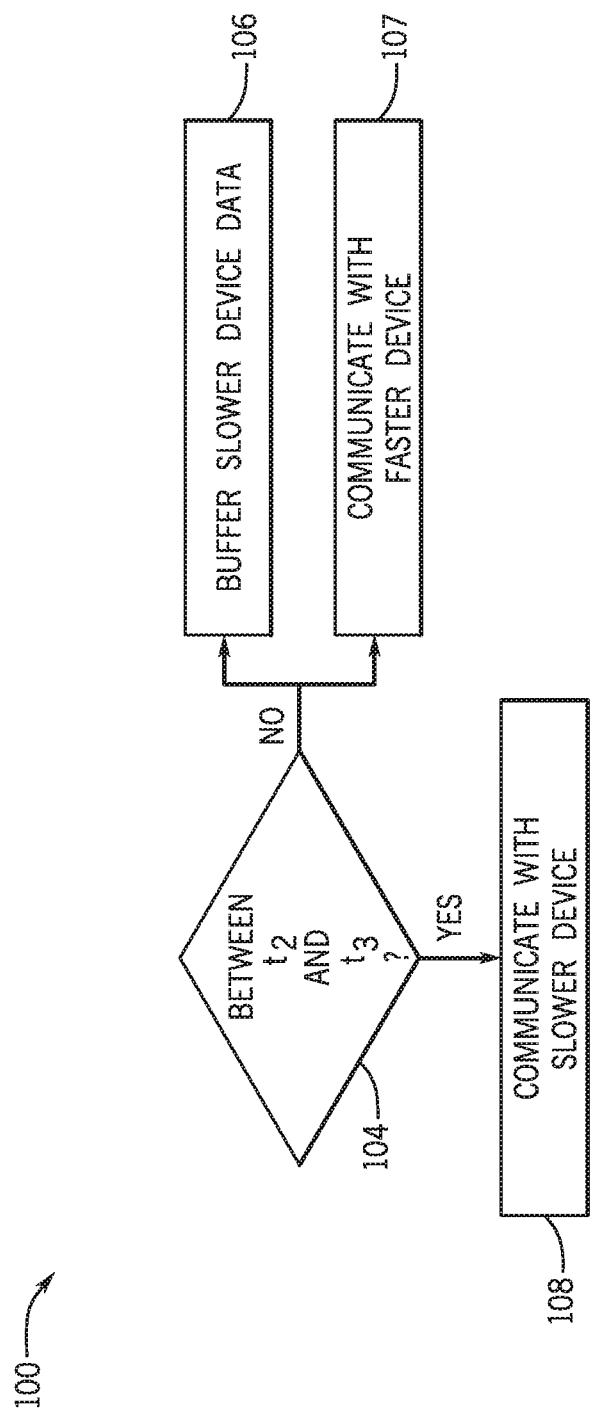
FIG. 4 is a flow diagram of an embodiment of a process whereby communication between the one or more high speed I/O subsystem and the industrial controller and between the one or more linking devices and the industrial controller is enabled.

More specifically, FIG. 2 is a block diagram of an embodiment of a controller frame 59 associated with the one or more high speed I/O subsystem 48, 50 of FIG. 1 and the macrocycle 58 corresponding to the one or more linking devices 36, 38 (e.g., FOUNDATION Fieldbus™ linking devices) of FIG. 1. Furthermore, FIG. 3 is a block diagram of the controller frame 59 of FIG. 2 and corresponding sections of the controller frame 59. To facilitate discussion, the embodiments depicted in FIG. 2 and FIG. 3 will be discussed together in detail below. In the illustrated embodiments, the controller frame 59 executes faster than the macrocycle 58. For example, in the illustrated embodiment, the macrocycle 58 is an executed at a periodic time cycle that is a multiple of the periodic time cycle of the controller frame rate. Specifically, while the depicted embodiment shows that the controller frame rate may execute eight times faster than the macrocycle 58, in additional embodiments, the controller frame 59 may be executed any other number of times faster (e.g., or slower) than controller frame rate. For example, the controller frame 59 may execute two, four, sixteen, sixty-four or any suitable number of times faster than the macrocycle 58. Furthermore, in some embodiments, the start of the macrocycle may be synchronized (e.g., to begin) at the start of the controller frame 59. In the illustrated embodiment, the controller frames 59 have a duration between time to and time to as shown in timeline 79 corresponding to macrocycle time.

Furthermore, each controller frame 59 may be divided into various frame sections, each of the frame sections performing one or more specific functions. In the depicted embodiment, the controller frame 59 is divided into three frame sections: a first frame section 74, a second frame section 76, and a third frame section 78. In some embodiments, the first frame section 74, the second frame section 76, and the third frame section 78 may occur sequentially (e.g., the first frame section 74 occurs before the second frame section 76, which occurs before the third frame section 78), but in other embodiments, the first frame section 74, the second frame section 76, and the third frame section 78 may occur in any order. In particular, the first frame section 74 may be used by the controller 26 for receiving data inputs from the high speed I/O subsystems, the linking device 36, and/or any devices communicatively coupled to the industrial controller 26. The second frame section 76 may be used by the controller 26 for executing, via the processor (e.g., processor 27), specific instructions stored in the memory (e.g., memory 35) for data processing. The third frame section 78 may be used by the controller 26 for sending the data outputs to the high speed I/O subsystems, the linking devices, and/or any devices communicatively coupled to the industrial controller 26 (e.g., to actuate the corresponding subsystem). Accordingly, the first frame section 74 and the third frame section 78 may be used by the controller 26 to communicate (e.g., receive and send, respectively) data, and the second frame section 76 may be used by the controller 26 to execute instructions store in memory (e.g., perform calculations and/or execute code).

Moreover, the first frame section 74 may have a time duration between time $t_1$ and time $t_2$, such that the industrial controller 26 may receive I/O input data from the various high speed I/O subsystems (e.g., the first high speed I/O subsystem 48 and the second high speed I/O subsystem 50) during the first frame section 74. As mentioned above, the various high speed I/O subsystems may send I/O input data via the I/O network 40. In some embodiments, during the first frame section 74, the industrial controller 26 receives a first sequence of bits (e.g., data) of I/O input data from the high speed I/O subsystems. Specifically, the industrial controller 26 may start receiving bits of I/O input data at time $t_1$ of the controller frame 59. The industrial controller 26 may continue to receive bits of I/O input data for the duration of the first frame section 74 (e.g., until time $t_2$). For example, the high speed I/O subsystem (e.g., the first I/O subsystem 48), such as the PVIB, may communicatively couple to the industrial machinery to communicate measurements (e.g., as signal data) from the industrial machinery to the industrial controller 26. Accordingly, the measurements may serve as the I/O input data (e.g., bits) that are communicated to the industrial controller 26 in the first frame section 74 of the controller frame 59. The I/O input data may be communicated until time $t_2$ of the controller frame 59. In some embodiments, slower data, such as data incoming from FOUNDATION Fieldbus™ devices (e.g., linking devices 36, 38, field devices 30, 32, 34) had previously been uncontrolled in the timing of transmission, requiring a worst-case assumption on bandwidth utilization during the first frame section 74. The techniques described herein, alternatively or additionally, enable the use of other frames, such as the second frame 76, for slower communications (e.g., communications associated with the FOUNDATION Fieldbus™ devices). Accordingly, the slower data (e.g., associated with the linking devices 36, 38) may be buffered, and the industrial controller 26 may receive the slower data communicated via the I/O network 40 at the start of the second frame section 76 of the next controller frame.

In some embodiments, the first frame section 74 may enable the communication between various high speed I/O subsystems and the industrial controller 26, via frame synchronization features, such that the industrial controller 26 may receive I/O input data from the various high speed I/O subsystems. The I/O input data from a first high speed I/O subsystem 48 may include bits that indicate to the industrial controller 26 the beginning and end of the communication of the I/O input data from the first high speed I/O subsystem 48. In some embodiments, the industrial controller 26 may connect to the second high speed I/O subsystem 50, while the first high speed I/O subsystem 48 is communicating I/O input data to the industrial controller 26. In this case, the industrial controller 26 may store or ignore the I/O input data from the second high speed I/O subsystem 50 until the first high speed I/O subsystem 48 finishes communicating I/O input data to the industrial controller 26. After the industrial controller 26 receives the I/O input data from the first high speed I/O subsystem 48, the industrial controller 26 may start receiving the I/O input data form the second high speed I/O subsystem 50. Furthermore, the industrial controller 26 may be modified to simultaneously receive I/O input data from the first high speed I/O subsystem 48 and from the second high speed I/O subsystem 50.

In the illustrated embodiment, after the first frame section 74 ends (e.g., the controller frame reaches time $t_2$), the controller frame 59 progresses to the second frame section 76, whereby the transmission (e.g., receiving and sending) of HSE input and HSE output data, herein called "HSE data," is enabled, as described in more detail below. The HSE input data refers to data communicated by the linking devices 36, 38 to the industrial controller 26 via the I/O network 40 (e.g., HSE) and HSE output data refers to data communication from the industrial controller 26 to the linking devices 36, 38 via the I/O network 40. Furthermore, between time $t_2$ and time $t_3$, the second frame section 76 of the controller frame 59 causes the industrial controller 26 to execute instructions associated with performing standard operations, such as calculations (e.g., with the I/O input data received in the first frame section 74). As such, during the second frame section 76, the industrial controller 26 does not communicate with the fast (e.g., high speed) I/O subsystems 48, 50. In some embodiment, this time period is used for the communication of data, via the slower (e.g., FOUNDATION Fieldbus™) protocol, between the linking device 36 and the industrial controller 26. That is, in some embodiments, instead of communicating with the industrial controller 26, the various high speed I/O subsystems remain idle waiting for the second frame section 76 to end (e.g., time $t_3$). To continue the example above, after the PVIB sends measurements to the industrial controller 26 in the first frame section 74, the industrial controller 26 may perform calculations in the second frame section 76 to determine a control scheme for actuating suitable components of the industrial machinery associated with the PVIB.

After the second frame section 76 ends (e.g., the controller frame reaches time $t_3$), the controller frame 59 progresses to the third frame section 78, whereby the industrial controller 26 sends I/O output data to the high speed I/O subsystems 48, 50. In the illustrated embodiment, the third frame section 78 has a time duration from time $t_3$ until time $t_4$. During the third frame section 78, the industrial controller may send I/O output data to the corresponding high speed I/O systems 48, 50. The high speed I/O subsystems 48, 50 may then send the I/O output data to corresponding field devices to actuate the field devices. To continue the example above, after the PVIB sends measurements to the industrial controller 26 in the first frame section, and after the industrial controller 26 performs the calculations in the second frame section 76, the industrial controller 26 may send I/O output data to the corresponding high speed I/O subsystem in the third frame section 78. The I/O output data may include the control scheme for actuating the subcomponents of the industrial machinery associated with the PVIB. The I/O subsystems 48, 50 may then send the I/O output data to the associated subcomponents of the industrial machinery (e.g., according to the calculations performed in the second frame section 76).

As mentioned above, in some embodiments, the linking device 36 is also coupled to the industrial controller 26 via the I/O network 40 (e.g., HSE network). The linking device 36 operates in the macrocycle 58, which may correspond to a FOUNDATION Fieldbus™ protocol macrocycle. The macrocycle 58 may be partitioned into any suitable number of controller frames that may each be partitioned into frame segments that may perform specific tasks, such as executing instructions stored in memory via a processor or enabling communication with external devices (e.g., field devices and the industrial controller). For example, the macrocycle 58 may include a section that allows for the communication with the industrial controller 26, another section for performing calculation, and any other number of additional sections for performing suitable functions. However, as mentioned above, in some embodiments, the communication between the linking device 36 and the industrial controller 26 may not operate in a suitable manner. That is, the bandwidth used for communicating the slower speed protocol data via the I/O network 40 may consume Ethernet communications bandwidth that interferes with the high speed controller frame-rate data.

During the first frame section 74 of the controller frame 59 the industrial controller 26 communicate data between the high speed I/O subsystems 48, 50. In some embodiments, during the first frame section 74, the industrial controller 26 may receive input data via the faster protocol (e.g., the high speed I/O subsystem along the I/O network 40) before receiving inputs from the slower protocol (e.g., the linking devices 36, 38). That is, the industrial controller 26 may prioritize the data from the faster protocol over the data from the slower protocol since, the bandwidth used for communicating the slower speed protocol data may consume Ethernet communications bandwidth that interferes with the high speed controller frame-rate data. As such, in some embodiments, during the first frame section 74 of the controller frame 59, the industrial controller 26 may solely communicate with the high speed I/O subsystems 48, 50.

To facilitate the communication of HSE data between the linking devices 36, 38 and the industrial controller 26, the second frame section 76 of the controller frame 59 may enable the communication of HSE data with the linking devices 36, 38. As mentioned above, during the second frame section 76, the high speed I/O subsystems 48, 50 do not communicate with the industrial controller 26. Accordingly, no transmission of high speed I/O data (or any other faster data) occurs during the second frame section 76 (e.g., between the high speed I/O subsystems 48, 50 and the industrial controller 26), such that the transmission of the HSE data (e.g., the slower data) is enabled because the transfer of high speed I/O data (e.g., the faster data) is not taking place to disrupt the transfer of HSE data. In some embodiments, the HSE data that was not communicated during the other frame sections (e.g., the first frame section 74 or the third frame section 78) is communicated during the second frame section 76.

More specifically, the linking device 36 may buffer (e.g., during the first and third frame sections 74, 78) corresponding HSE data before transmitting the HSE data to the industrial controller 26 during the second frame section 76. Similarly, the second linking device 38 may buffer (e.g., during the first and third frame sections 74, 78) corresponding HSE data before transmitting the HSE data to the industrial controller 26 during second frame section 76. In addition, the industrial controller 26 may buffer (e.g., during the first and third frame sections 74, 78) corresponding data before transmitting the data to the linking devices 36, 38 (e.g., during the second frame section 76). Accordingly, each device (e.g., the first linking device 36, the second linking device 38, and the industrial controller 26) may buffer corresponding data during the first and third frame sections 74, 78 before having the data communicated during the second frame section 76. In some embodiments, each device (e.g., the first linking device 36, the second linking device 38, and the industrial controller 26) is independently responsible for buffering communications until the quiescent period of high-speed communications occurs (e.g., the second frame section 76).

In some embodiments, the first linking device 36 may cause data from the first linking device 36 to be temporarily buffered (e.g., during the first and third frame section 74, 78) before being communicated to the industrial controller 26 (e.g., during the second frame section 76). The HSE data may be buffered by the respective devices for any suitable length of time. For example, the data may be buffered for 12 millisecond (ms) before communication is enabled (e.g., during the second frame section 76).

FIG. 3 is a flow diagram 100 of an embodiment of a process whereby communication between the one or more high speed I/O subsystems 48, 50 and the industrial controller 26 and between the one or more linking devices 36, 38 (e.g., low speed protocol) and the industrial controller 26 are enabled. The process may be implemented as computer code or instructions executable by processors 13, 17, 19, and/or 27, such that the code or instructions are stored in memories 15, 21, 23, and/or 35. In some embodiments, the linking devices 36 and 38 may determine the time at which the controller frame 59 is operating at. In particular, the linking devices 36, 38 may determine if the controller frame 59 is operating during the second frame section 76 (e.g., between times $t_2$ and $t_3$) of the controller frame 59 (decision block 104). When the controller frame 59 is not operating between times $t_2$ and $t_3$, the linking devices 36, 38 may buffer corresponding data (process block 106) (e.g., slow speed data). In addition, when the controller frame 59 is not operating between times $t_2$ and $t_3$, the industrial controller 26 may also buffer data to the slower devices (e.g., linking device 36, 38) (process block 106) and proceed with standard operations, such as communicating with the other faster device(s) (e.g., the high speed I/O subsystem 48, 50) (process block 107). After the slow speed data is buffered (e.g., during the first frame section 74 between $t_1$ and $t_2$ and the third frame section 78 between $t_3$ and $t_4$), the slow speed data (e.g., between the industrial controller 26 and the linking devices 36 and 38) is communicated between times $t_2$ and $t_3$ (process block 108). That is, between the times $t_2$ and $t_3$ (e.g., during the second frame section 76), the communications between the linking devices 36, 38 and the industrial controller 26 may be enabled. While the subject matter discussed herein include two linking devices 36, 38, it should be understood that the subject matter disclosed herein may be applicable to one, three, four, six, or any suitable number of linking devices.

The industrial controller 26 may be communicatively coupled to the linking devices 36, 38, the high speed I/O subsystems 48, 50, and the like, via the I/O network 40 (e.g., Ethernet network). As mentioned above, the first frame section 74 of the controller frame 59 may enable communication from the high speed I/O subsystems 48, 50 to the industrial controller 26. In addition, the second frame section 76 of the controller frame 59 may enable the processing of high speed data from the high speed I/O subsystems 48, 50 to perform standard operations, such as determine values suitable for actuating subsystems. Moreover, the third frame section 78 of the controller frame 59 may enable communication (e.g., of the high speed data, such as the values for actuating the subsystems) to the high speed I/O subsystems 48, 50.

In some embodiments, each of the linking devices 36, 38 may determine if the controller frame 59 is between times $t_2$ and $t_3$ (process block 104). Indeed, in some embodiments, the linking devices 36, 38 may each determine the segment of the controller frame 59. For example, the linking devices 36, 38 may determine that the controller frame 59 is operating between times $t_1$ and $t_2$ (e.g., during the first frame section 74), between times $t_2$ and $t_3$ (e.g., the second frame section 76), or between times $t_3$ and $t_4$ (e.g., the third frame section 78).

When the linking devices 36, 38 determine that controller frame 59 is not operating between times $t_2$ and $t_3$, the communication received from and transmitted to the industrial controller 26 is buffered (process block 106). In addition, when the controller frame is not operating between times $t_2$ and $t_3$, the industrial controller 26 may proceed with standard operations. For example, in some embodiments, the communication that is not between times $t_2$ and $t_3$ (e.g., not during the second frame section 76) is with the high speed I/O subsystems 48, 50 (process block 107). In some embodiments, the industrial controller 26 may buffer (process block 106) slow speed data associated with the linking devices 36, 38 during the first frame section 74 and the third frame section 78. In other exemplary embodiments, performing standard operations may include, the industrial controller 26 receiving high speed data from the high speed I/O subsystems 48, 50 during the first frame section 74 of the controller frame 59 and sending the high speed data to the high speed I/O subsystem 48 during the third frame section 78 of the controller frame 59. In some embodiments, the communication sent from the high speed I/O subsystem 48 to the industrial controller 26 may provide the industrial controller 26 with data indicative of the performance of the industrial machinery. Furthermore, in some embodiments, the communication sent from the industrial controller 26 to the high speed I/O subsystem 48 may be used to actuate the industrial machinery (e.g., the valve of the turbine system).

As described in detail above, the slow speed data from the linking devices 36, 38 may be buffered until the next suitable section (e.g., the second frame section 76) of the control frame 59. Furthermore, the slow speed data from the industrial controller 26 to the linking devices 36, 38 may be buffered until the second frame section 76 of the controller frame 59, during which the communication between the linking device 36 and the industrial controller 26 is enabled (process block 108).

After determining that the industrial controller 26 is operating during the second frame section 76 (e.g., between $t_2$ and $t_3$) of the controller frame 59, the communication between the industrial controller 26 and the linking device 36 (e.g., slow speed data) is enabled (process block 108). In some embodiments, the industrial controller 26 may not communicate with the high speed I/O subsystems 48, 50 between $t_2$ and $t_3$, where the communication between the linking device(s) 36 and the industrial controller 26 is enabled. In some embodiments, the slow speed data from the industrial controller 26 to the linking devices 36, 38 that was buffered (process block 106) because the controller frame 59 was not operating was not between $t_2$ and $t_3$, is communicated (e.g., process block 108) when the controller frame 59 is operating between $t_2$ and $t_3$. For example, after the first linking device 36 buffers the slow speed data between $t_1$ and $t_2$ or between $t_3$ and $t_4$, the communication of the slow speed data with the industrial controller 26 may be enabled between $t_2$ and $t_3$.

Technical effects of the disclosure include systems and methods for enabling the communication (e.g., the transmission/sending of data or the receiving of data) between slower (e.g., low speed) devices (e.g., linking devices 36, 38) and an industrial controller 26 and the communication between high speed I/O subsystems 48, 50 and the industrial controller 26. In an embodiment, the communication between the high speed I/O subsystems 48, 50 and the industrial controller 26 occur along a larger bandwidth and faster rate than the communication between the low speed devices and the industrial controller 26. In some embodiments, communications between the high speed I/O subsystems 48, 50 are enabled between a first and third frame section 74, 78 of the controller frame 59 (e.g., to actuate a corresponding industrial machinery device). The (e.g., low speed) linking devices 36, 38 and the industrial controller 26 may independently track time using IEEE 1588, for example, to determine the sections of the controller frame 59 at which operations are occurring. Specifically, when the linking devices 36, 38 determine that the controller frame 59 is operating during the first and third frame sections 74, 78, the data from and to the linking devices 36, 38 may be buffered (e.g., for temporary storage). The buffered data between the linking devices 36, 38 and the industrial controller may be communicated during the second frame section 76 of the controller frame 59. The communication with the low speed devices may not interfere with the communication with the high speed devices, for example, to conserve bandwidth in a (e.g., Ethernet) network. Accordingly, a variety of communications devices (e.g., the linking devices 36, 38, the industrial controller 26, and the high speed I/O subsystems 48, 50) on an Ethernet network independently keep track of time using IEEE 1588. The communication devices independently use the schedule of high speed and low speed communications to interleave communications, such that bandwidth utilization is improved. High speed data is communicated during one section of the controller frame, and low speed data is communicated during a different section of the controller frame 59.

This written description uses examples to disclose the claimed subject matter, including the best mode, and also to enable any person skilled in the art to practice the claimed subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial controller configured to control operation of an industrial system, the industrial controller comprising:
   a processor; and
   a memory storing instructions, wherein the instructions are configured to cause the processor to:
   communicate high speed data in a first industrial protocol between the industrial controller and a high speed device during a first frame section and a third frame section, but not during a second frame section of a controller frame of the industrial controller;
   communicate, between the industrial controller and a linking device, linking device data in a second industrial protocol during the second frame section but not during the first frame section of the controller frame, wherein the communication of the linking device data is slower than the communication of the high speed data; and
   buffer the communication of the linking device data during the first frame section but not during the second frame section.

2. The industrial controller of claim 1, wherein the industrial controller is configured to operate using IEEE 1588 precision time protocol (PTP) to synchronize communication of the high speed data and the linking device data.

3. The industrial controller of claim 1, wherein the instructions configured to communicate the linking device data comprise communicating the linking device data in the second industrial protocol between the industrial controller and the linking device during the second frame section, but not during the first frame section nor the third frame section of the controller frame.

4. The industrial controller of claim 1, wherein the instructions are configured to cause the processor to send an output control signal to the high speed device during the third frame section included in the controller frame, wherein the second and third frame sections are adjacent to each other in the controller frame.

5. The industrial controller of claim 1, wherein the instructions are configured to cause the processor to receive, during the second frame section, the buffered communication of the linking device data during the third frame section.

6. The industrial controller of claim 1, wherein the instructions are configured to cause the processor to receive, during the second frame section, communication buffered by the linking device data during the first frame section.

7. The industrial controller of claim 1, wherein the controller frame comprises a periodic time cycle used by the industrial controller to guarantee an execution time for a set of instructions.

8. The industrial controller of claim 1, wherein the industrial system comprises a power generation system, a turbine system, a gasification system, a gas treatment system, a heat recovery steam generation (HRSG) system, or any combination thereof.

9. The industrial controller of claim 1, wherein the first industrial protocol comprises an Ethernet Global Data (EGD) communications protocol, and wherein the second industrial protocol comprises a FOUNDATION Fieldbus ™ protocol.

10. The industrial controller of claim 1, wherein instructions configured to cause the processor to buffer the communication of the linking device data comprise buffering the communication of the linking device data during the first frame section and the third frame section.

11. A method of communicating data associated with an industrial system, comprising:
communicating, via a processor of an industrial controller, high speed data in a first industrial protocol between the industrial controller and a high speed device during a first frame section and a third frame section, but not during a second frame section of a controller frame of the industrial controller; and
communicating, via the processor, between the industrial controller and a linking device, linking device data in a second industrial protocol during the second frame section, wherein the communication of the linking device data is slower than the communication of the high speed data; and
buffering, via the processor, the communication of the linking device data during the first frame section and the third frame section, but not during the second frame section.

12. The method of claim 11, wherein the linking device is configured to communicate data from a field device to the industrial controller via a FOUNDATION Fieldbus™ H1 bi-directional communications protocol network, and the high speed device is configured to communicatively couple a subcomponent of the industrial system to the industrial controller via Ethernet Global Data (EGD) Network, wherein the FOUNDATION Fieldbus™ H1 bi-directional communications protocol network communicates at a speed of 31.25 kilobites per second.

13. The method of claim 11, wherein the controller frame occurs periodically at least eight times faster than a macro-cycle associated with the linking device.

14. The method of claim 11, wherein the industrial system comprises a power generation system, a turbine system, a gasification system, a gas treatment system, a heat recovery steam generation (HRSG) system, or any combination thereof.

15. A non-transitory tangible computer-readable medium storing instructions thereon that are configured to be executed by a processor of an industrial controller configured to control operations of an industrial system, wherein the instructions, when executed, are configured to cause the processor to:
communicate high speed data in a first industrial protocol between the industrial controller and a high speed device during a first frame section and a third frame section but not during a second frame section of a controller frame of the industrial controller;
communicate, between the industrial controller and a linking device, linking device data in a second industrial protocol during the second frame section, wherein the communication of the linking device data is slower than the communication of the high speed data; and
buffer communication of the linking device data during the first frame section and the third frame section, but not during the second frame section, wherein the high speed data comprises data indicative of vibrations associated with the industrial system, data indicative of fuel flow associated with the industrial system, data indicative of compressor discharge pressure associated with the industrial system, or any combination thereof, and wherein the linking device data comprises compressor inlet bleed temperature associated with the industrial system, fuel tank fluid level associated with the industrial system, lube oil temperature associated with the industrial system, or any combination thereof.

16. The non-transitory tangible computer-readable medium of claim 15, wherein the industrial system comprises a power generation system, a turbine system, a gasification system, a gas treatment system, a heat recovery steam generation (HRSG) system, or any combination thereof.

17. The non-transitory tangible computer-readable medium of claim 15, wherein the linking device is configured to communicatively couple a field device via a FOUNDATION Fieldbus™ H1 bi-directional communications protocol network, wherein the linking device is communicatively coupled to the industrial controller via a high speed Ethernet (HSE) network, wherein the HSE network communicates at a rate faster than the FOUNDATION Fieldbus™ H1 bi-directional communications protocol network.

18. The non-transitory tangible computer-readable medium of claim 15, wherein the instructions configured to cause the processor to communicate the linking device data comprise communicating the linking device data in the second industrial protocol between the industrial controller and the linking device during the second frame section but not during the first frame section and the third frame section of the controller frame.

19. The non-transitory tangible computer-readable medium of claim 15, wherein the instructions are configured to cause the processor to send an output control signal to the high speed device during the third frame section included in the controller frame, wherein the second and third frame sections are adjacent to each other in the controller frame.

20. The non-transitory tangible computer-readable medium of claim 15, wherein the instructions are configured to cause the processor to receive, during the second frame section, the buffered communication of the linking device data during the third frame section.

* * * * *